(12) United States Patent
Mella

(10) Patent No.: US 10,101,215 B2
(45) Date of Patent: Oct. 16, 2018

(54) SENSING ASSEMBLY AND METHOD FOR FABRICATING A SENSING ASSEMBLY

(71) Applicant: Endress + Hauser Wetzer GmbH + Co. KG, Nesselwang (DE)

(72) Inventor: Stefano Mella, Novate (IT)

(73) Assignee: ENDRESS + HAUSSER WETZER GMBH + CO. KG, Nesselwang (DE)

( * ) Notice: Subject to any disclaimer, the term of this patent is extended or adjusted under 35 U.S.C. 154(b) by 295 days.

(21) Appl. No.: 14/969,050

(22) Filed: Dec. 15, 2015

(65) Prior Publication Data

US 2016/0178448 A1    Jun. 23, 2016

(30) Foreign Application Priority Data

Dec. 18, 2014   (EP) ..................................... 14198857

(51) Int. Cl.
| | | |
|---|---|---|
| *G01K 7/00* | (2006.01) | |
| *G01K 1/00* | (2006.01) | |
| *G01K 3/00* | (2006.01) | |
| *G01K 1/02* | (2006.01) | |
| *G01K 1/08* | (2006.01) | |

(52) U.S. Cl.
CPC ............... *G01K 1/026* (2013.01); *G01K 1/08* (2013.01)

(58) Field of Classification Search
USPC ........ 374/166, 110, 116, 137, 208, 179, 183
See application file for complete search history.

(56) References Cited

U.S. PATENT DOCUMENTS

| | | | |
|---|---|---|---|
| 4,216,028 A | 8/1980 | Kurita | |
| 5,071,258 A | 12/1991 | Usher | |
| 7,060,949 B1 * | 6/2006 | Davis | G01K 7/22 219/536 |
| 7,871,198 B2 * | 1/2011 | Rempe | G01K 7/02 136/230 |
| 2010/0020848 A1 * | 1/2010 | Nazmy | C22C 19/057 374/179 |

FOREIGN PATENT DOCUMENTS

WO    2008015750 A1    2/2008

OTHER PUBLICATIONS

European Patent Office Search Report, Munich, DE, dated Jun. 22, 2015.

* cited by examiner

*Primary Examiner* — Mirellys Jagan
(74) *Attorney, Agent, or Firm* — Bacon & Thomas, PLLC

(57) ABSTRACT

A method for fabricating a sensing assembly, preferably for sensing temperature, comprising: positioning, e.g. inserting, at least one elongated member, e.g. a temperature probe, a cable or a wire, preferably for determining a temperature, and at least one pre-formed fitting, e.g. a ceramic block, into an inner cavity of a sleeve member, e.g., a tube.

14 Claims, 4 Drawing Sheets

SENSING ASSEMBLY AND METHOD FOR FABRICATING A SENSING ASSEMBLY

TECHNICAL FIELD

The invention relates to a method for fabricating a sensing assembly, preferably for measuring temperature, and a sensing assembly, preferably for measuring temperature.

BACKGROUND DISCUSSION

Thermometers and other measuring devices in an industrial environment are required to have properties such as robustness, reliability and high performance.

For example patent publication U.S. Pat. No. 2,930,827 describes thermocouple wires which are packed in magnesium oxide insulators. These insulators are spaced from each other, form chambers and are arranged in a tubular shield. The insulators and the chambers in between the insulators serve to decrease heat transfer through the probe.

European patent publication EP 0777115 B1 discloses a temperature probe which comprises sliding cylinders which are fixed to the protection tube of a respective thermocouple. The respective protection tubes and the sliding cylinders are arranged in a probe tube. The whole arrangement serves to improve the handling in case one of the thermocouples has to be replaced.

SUMMARY OF THE INVENTION

The object of the present invention is to propose a sensing assembly, preferably for measuring temperature, especially a multipoint probe, i.e. an assembly with multiple measuring points, which is easy to fabricate and has a high mechanical performance.

The object is achieved by way of a method for fabricating a sensing assembly and a sensing assembly.

Regarding the method the problem is solved by a method for fabricating a sensing assembly, preferably for sensing or measuring temperature, comprising: positioning, e.g. inserting, at least one elongated member, e.g. a temperature probe, a cable or a wire, preferably for determining a temperature, and at least one pre-formed fitting, e.g. ceramic block, into an inner cavity of a sleeve member.

The sleeve member may be made out of a metallic material and may have a tube shaped form. At least one, preferably solid, in particular made out of a ceramic material, pre-formed fitting, which e.g. may have the shape of a cylindrical block, is arranged in the sleeve member.

The fitting may, preferably completely, fills the cavity of the sleeve member. The fitting may be mechanically connected, e.g. clamped, for example by way of a drawing process, to the sleeve member. However in another embodiment the fitting may be shattered or crushed after it has been inserted into the cavity of the sleeve member.

The fitting block may have a multitude of openings, wherein at least one elongated member may at least partially be arranged in one of the openings. The elongated member, which may very well be a temperature probe, a cable or a wire, may be mechanically connected, preferably clamped, e.g. by way of mechanically deforming the sleeve member, e.g. by way of a drawing process or a compression, to the fitting block.

The sensing assembly, preferably for measuring temperature, can be part of a thermometer or the thermometer itself. The assembly can hence further comprise a measuring electronics, i.e. a measuring transmitter which serves to transform a signal received via the elongated member, which may be at least one temperature probe, into an output signal, which is e.g. in conformity with a standard fieldbus protocol.

During operation the sleeve member may be in contact with a process medium temperature is to be determined at least at one point in space. With regard to temperature measurement and robustness a metallic material has proven to be advantageous for the sleeve member. The sleeve member may be a tube or have a tube shaped form with two open ends or a closed end and an open end. Via an open end of the sleeve member at least one pre-formed fitting may be inserted into the sleeve member. Hence, either a single pre-formed fitting is inserted or a multitude of pre-formed fittings are inserted into the sleeve member.

The at least one pre-formed fitting may thus completely fill the interior of the sleeve member, e.g. between a first height and a second height along the length of the sleeve member. In case of a multitude of fittings these fittings may be identical, i.e. have the same geometry, e.g. height, diameter etc. However, the pre-formed fittings as the case may be may have a different number of openings or recesses, respectively.

Also, depending on the length of the sleeve member it may only be necessary to insert a single pre-formed fitting or it may be required to insert a plurality of fittings in order to completely fill the interior of the sleeve member—e.g. at least between the two heights along the length of the outer sleeve.

In case of a plurality of fittings these fittings are arranged directly adjacent to one another, i.e. are piled on top of each other (stacked), inside the sleeve member, i.e. in its cavity.

The at least one fitting may be pre-formed in the sense that it is a solid body which has a certain shape which is fixed beforehand. The fitting block may be made out of a ceramic, preferably a refractory ceramic, material. Also, the material the fitting block is made out of may preferably be an electrically insulating material, such as e.g. magnesium oxide.

The pre-formed fitting also has at least one opening in which the elongated member may be inserted. The opening can for example be a boring which was fabricated into the massive body of the pre-formed fitting. Each fitting can comprise a plurality of such openings or recesses. Also one or more of the openings can be a blind hole. Each fitting block may then comprise the same amount of borings. However, the amount of borings in each fitting may decrease/increase from one fittings to another along the stacked array of fittings. This decrease/increase may result in the presence of a blind hole in one or more of the fittings.

The at least one fitting may be mechanically connected to the sleeve member and/or to the elongated member, e.g. a compression fitting may be used which is achieved by deforming the sleeve member.

The elongated member, which may be a temperature probe, may as well comprise an outer sheath in which at least one temperature sensor is arranged. The connection between the elongated member may be a force-fit between the sleeve member and the elongated member or the fitting block. The mechanical connection may also be a form-fit between the fitting and the sleeve member.

The method for connecting the fitting with the sleeve member and the elongated member, which may be the outer sheath of a temperature probe, may e.g., be a drawing process. The method employed for fixing or arranging the elongated member in the sleeve member may also be at least one of the following: hammering, filing, rolling or swaging of the sleeve member. The connection process may comprise the step of reducing the diameter of the assembly after the at least one fitting and the at least one elongated member are arranged inside, i.e. in the cavity, of the sleeve member. However, any other forming process (which doesn't remove any material) may be employed.

When deforming the sleeve member in a manner described above the fitting may be shattered, i.e., is brought in a pulverulent form. Hence, the cavity of the sleeve member may filled, preferably completely filled with the residues of the material the fitting is made out of.

According to an embodiment of the method the at least one fitting has at least one opening, which serves for receiving the elongated member, preferably the fitting has a multitude of openings, each of which may serve for receiving an elongated member. The opening may be an opening extending end-to-end through the fitting. However the opening may be a blind-hole.

According to another embodiment of the method the method comprises the step of positioning, e.g. inserting, the at least one elongated member into the opening. After the elongated member has been inserted into the at least one opening of the at least one fitting, both can be inserted into the sleeve member. However, it is possible to first insert the at least one fitting into the sleeve member, i.e., into its cavity, and afterwards insert the elongated member into the at least one opening.

According to another embodiment of the method the at least one fitting has at least one recess, which serves for receiving the elongated member, preferably the fitting has a multitude of recesses, each of which may serve for receiving an elongated member.

According to another embodiment of the method the method further comprises: positioning, e.g. inserting, the at least one elongated member in the recess.

According to another embodiment of the method the method further comprises: inserting the at least one elongated member at least partially into the at least one pre-formed fitting, e.g., ceramic block, e.g., into a continuous opening of the at least one fitting.

According to another embodiment of the method the method further comprises: inserting the at least one fitting at least partially into the (inner) cavity of the sleeve member.

According to another embodiment of the method the method thus further comprises: shattering the fitting positioned within the cavity, e.g., by deforming the sleeve member.

According to another embodiment of the method the pre-formed fitting is at least partially, preferably completely, shattered.

According to another embodiment of the method the deforming of the sleeve member comprises pressing and/or drawing the sleeve member.

According to another embodiment of the method the at least one fitting is shattered during a drawing process of the outer sleeve and/or the at least one elongated member.

According to another embodiment of the method fitting is made out of an insulating material.

According to another embodiment of the method the method further comprises: embedding the at least one elongated member in an insulating material of the, preferably metallic, sleeve member.

According to another embodiment of the method the fitting is dimensioned or arranged in such a manner in the sleeve member that it, especially completely, fills the cavity of the sleeve member.

According to another embodiment of the method the at least one elongated member is mechanically connected, preferably clamped, e.g. by way of the drawing process, via the shattered and/or squeezed material the fitting is made out of.

According to another embodiment of the method the at least one elongated member has a rod like form in which at least one sensor element is arranged, preferably at the tip of the elongated member.

According to another embodiment of the method the at least one elongated member has a metallic outer sheath, which is filled with an insulating material in which the sensor element, and preferably connection wires of the sensor element, is embedded.

According to another embodiment of the method the at least one sensor element is either a thermocouple or a resistance thermometer.

According to another embodiment of the method in each of the openings of the at least one fitting either a temperature probe or a dummy element, in which no sensor element is arranged or which does not serve for determining a temperature, is inserted.

According to another embodiment of the method the dummy element has a metallic outer sheath, which is filled with an insulating material.

According to another embodiment of the method the elongated member, e.g. the temperature probe, extends along the length of the sleeve member in one of the openings in the at least one fitting to a certain height along the length of the sleeve member.

According to another embodiment of the method a first elongated member, e.g. first temperature probe, extends to a first height along the length of the sleeve member in a first of the openings and a second elongated member, e.g. a second temperature probe, extends to a second height along the length of the sleeve member in a second of the openings.

According to another embodiment of the method multiple fittings are aligned in the sleeve member, preferably adjacent of each other, and the at least one elongated member, e.g. temperature probe, and/or the at least one dummy element, extends through at least one of the fitting blocks.

According to another embodiment of the method the sleeve member serves (also) as a thermowell.

Regarding the Measuring assembly, preferably for measuring a temperature, is fabricated according to method according to least one of the preceding embodiments.

In an embodiment of the temperature sensing assembly the at least one temperature probe has a rod like form in which at least one sensor element is arranged, preferably at the tip of the temperature probe.

In an embodiment of the temperature sensing assembly the at least one temperature probe has a metallic outer sheath, which is filled with an insulating material in which the sensor element, and preferably connection wires of the sensor element, is embedded.

In an embodiment of the temperature sensing assembly the at least one temperature probe is either a thermocouple or a resistance thermometer.

A temperature probe or in the case of multiple temperature probes each temperature probe is inserted into the opening of the at least one fitting block or the (aligned) openings of fitting blocks piled on top of each other in such a manner that the temperature probe is embedded to at least 80% of its length inside the opening or the openings or is almost completely embedded.

In an embodiment of the temperature sensing assembly in each of the openings of the at least one fitting block either a temperature probe or a dummy element, in which no sensor element is arranged, is inserted. Thus, there is preferably no empty opening. In each opening either an actual temperature probe or a dummy element which has similar properties as the temperature probe regarding mechanical forming is inserted.

In an embodiment of the temperature sensing assembly the dummy element has a metallic outer sheath, which is filled with an insulating material, e.g. magnesium oxide. The dummy element is preferably made of the same materials as the temperature probe and has the same geometry but no temperature sensor is arranged inside the dummy element.

In an embodiment of the temperature sensing assembly the temperature probe extends along the length of the outer sleeve in one of the openings in the at least one fitting block up to a certain height along the length of the outer sleeve.

In an embodiment of the temperature sensing assembly a first temperature probe extends to a first height along the length of the sleeve in a first of the openings and a second temperature probe extends to a second height along the length of the sleeve in a second of the openings. In this embodiment two or more temperature probes are present in the assembly. Although two probes may extend up to the same height along the length of the outer sleeve, in order to provide a multipoint measurement which allows temperature monitoring at different locations, e.g. for a 2D or 3D temperature profile, it is preferred that the probes extend up to different heights.

In an embodiment of the temperature sensing assembly multiple fitting blocks are aligned in the outer sleeve, preferably adjacent to each other, and the at least one temperature probe and/or the at least one dummy element, extends through at least one of the fitting blocks. For the purpose of mechanical forming of the assembly the dummy probe should extend through at least one of the openings. Thereby a more reliably result of the mechanical forming process is achieved.

In an embodiment of the temperature sensing assembly the outer sleeve has a first diameter and is at its proximal end connected to a tube having a second diameter which is larger than the first diameter of the sleeve. Here a method for pipe fitting can be employed.

In an embodiment of the temperature sensing assembly the outer sleeve has a first diameter and has at its proximal end a second diameter which is larger than the first diameter of the sleeve.

In an embodiment of the temperature sensing assembly the connection wires of the at least one temperature probe are connected to extension wires at a junction in the tube. The enlarged diameter of the tube or of the sleeve enables an easier access and fabrication to of the junction.

In an embodiment of the temperature sensing assembly in case of multiple temperature probes each probe is connected to extension wires at a correspondent junction in the tube or in the enlarged region with the second diameter.

In an embodiment of the temperature sensing assembly the tube is at least partially filled with an insulating material, preferably a resin, in which the junctions are embedded. Preferably the tube or the enlarged region is completely filled with the insulating material.

In an embodiment of the temperature sensing assembly the extension wires protrude from the tube or the enlarged region at the proximal end of the assembly. The extension wires can then be electrically connected with an already mentioned measuring electronics. Hence, a sensor signal from the temperature sensor may be coupled to the measuring electronics for the purpose of processing or further handling.

In an embodiment of the temperature sensing assembly the distal end of the sleeve is sealed by way of an end-plate or cap or filler material, e.g. for welding, soldering or brazing.

In an embodiment of the temperature sensing assembly the sleeve serves as a thermowell.

The order of steps of the method disclosed in the above may though be exchanged in order to arrive at the assembled temperature sensing assembly. However, the preferred order of steps is described in the above. The thereby fabricated assembly, especially multipoint assembly, can comprise independent temperature sensors each embedded in an outer sheath of a temperature probe. Conventionally these sensors are embedded in a refractory material which is poured into the outer sheath after one or more temperature sensors are inserted into the sheath. Such a platform is disclosed in British patent GB 2183909 and Japanese Patent JP S57103025. It is an advantage of the present invention that a temperature measuring assembly comprising a temperature probe is improved and the reliability is increased. By way of the proposed assembly the assembly is even able to work after one fault has occurred, i.e. after the outer sheath is broken due to abrasion or an impact caused by the process medium. In case of a multipoint assembly comprising multiple temperature probes the individual temperature probes may be operated independently and hence a fault of one of the temperature probes or one of the sensors therein does not prevent the assembly from further operation. By way of the double barrier in form of the outer sleeve and the outer sheath a high mechanical performances is achieved.

BRIEF DESCRIPTION OF THE DRAWINGS

The invention will further be explained on the basis of the following figures.

DETAILED DISCUSSION IN CONJUNCTION WITH THE DRAWINGS

Figure 1:
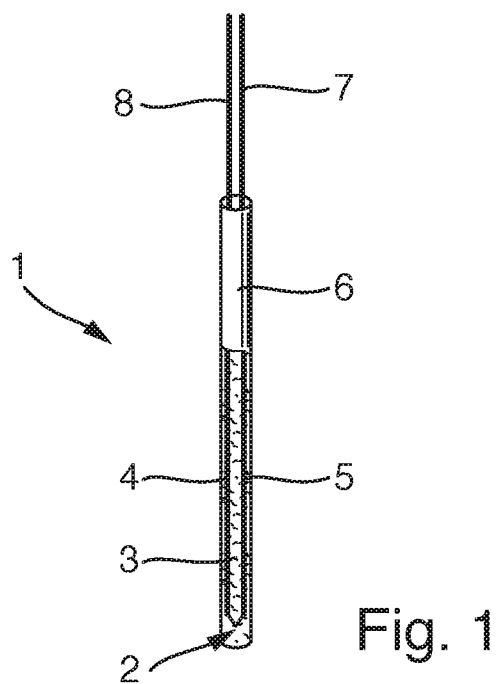
FIG. 1 shows a diagram of a temperature probe, which comprises a thermocouple.

The temperature probe 1 according to FIG. 1 comprises at least one thermocouple with thermo wires 4, 5. These thermo wires 4, 5 are connected at a hot junction 2 at which temperature is to be measured. The thermo wires 4, 5 are embedded in an insulation 3, made of an insulating material. The insulation 3 and the thermo wires 4, 5 are arranged in a protective sheath 6, i.e. outer sheath, which has a tubular form. The sheath 6 has a closed end in the vicinity of which the hot junction 2 is arranged. The thermo wires 4, 5 extend from the hot junction 2 through the sheath 6 up to the opposite end of the sheath 6. The thermo wires 4, 5 also protrude from this end of the sheath 6 and are connected to extension wires 7, 8. However, instead of the temperature probe 1 shown any other type of probe may be employed. Also, the invention is not limited to a measuring assembly but may be employed for fabricating any kind of assembly. Also, in general some type of wire or cable may be employed instead of the probe which is shown in FIG. 1. Nevertheless the temperature probe 1 remains a preferred embodiment.

Figure 2:
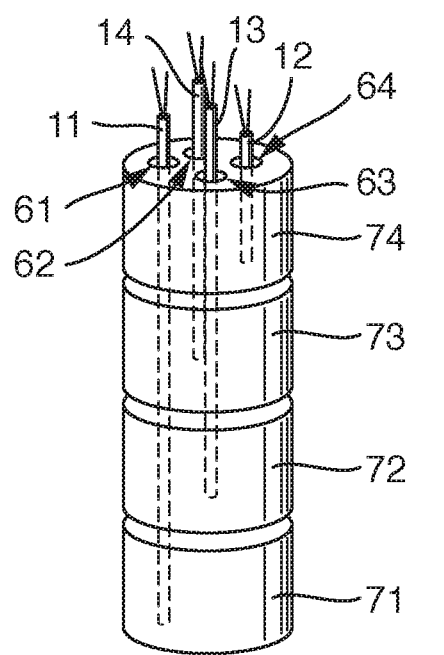
FIG. 2 shows a diagram of multiple fittings, in the form of blocks, into which multiple temperature probes are inserted.

FIG. 2 shows an arrangement of multiple fittings 71, 72, 73, 74 and multiple temperature probes 11, 12, 13, 14. The fittings 71, 72, 73, 74 here have the form of cylindrical blocks. In FIG. 2 the fittings 71, 72, 73, 74 are stapled upon each other to form a tower. However, there could be only a single fitting having corresponding openings 61, 62, 63, 64 or even more than four fittings 71, 72, 73, 74 shown.

The fittings 71, 72, 73, 74 are in alignment with each other. Additionally the fittings 71, 72, 73, 74 are piled on top of each other so that also corresponding openings lie on top of each other.

Into each of the openings 61, 62, 63, 64 a temperature probe 71, 72, 73, 74 is inserted. With regard to fitting 74, this fitting 74 has four openings 61, 62, 63, 64, wherein one of them i.e. opening 64 is a blind hole. The adjacent fitting 73 has one opening less, i.e. has three openings 61, 62, 63, wherein one of them is blind hole 62. The following fitting block 72 has only two openings 61, 63 of which one is a blind hole 63. The last fitting block 71 has only one opening 61, which opening is a blind hole 61. The blocks are arranged in a way that the opening 61 of the fitting block 74 forms a continuous, opening with the corresponding openings 61 of fittings 71, 72, and 73 which a temperature probe 11 or other elongated member, such as a cable or wire, can be inserted. The same is true for the blind holes of fittings 72, 73 and 74 which is part of a continuous opening in which another temperature probe, dummy element or other elongated member can be inserted.

All of the fitting blocks 71, 72, 73, 74 in FIG. 2 have the shape of a circular cylinder and when mounted or stapled upon each other form a longer cylinder with the same base area as the longer cylinder.

Figure 3:
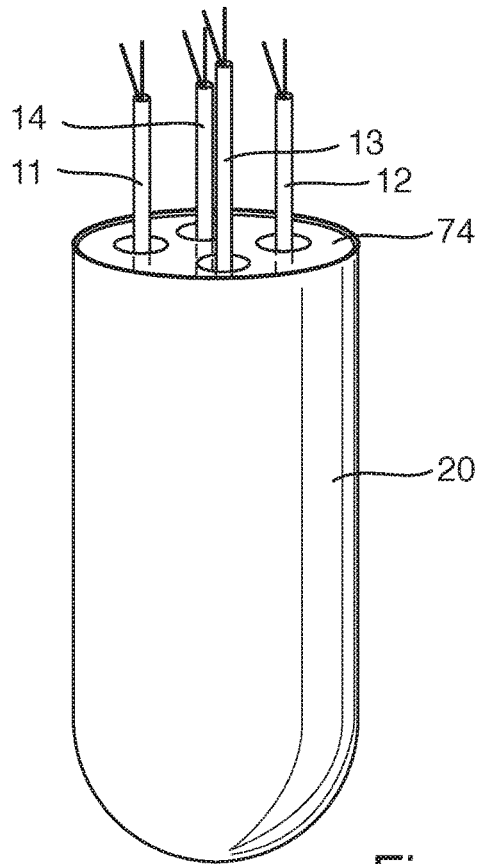
FIG. 3 shows a diagram of an assembly, in which the fittings are inserted before it is deformed.

This cylinder in which the temperature probes or other types of elongated bodies may already be inserted in is placed in a sleeve member 20. This arrangement is shown in FIG. 3. The sleeve member 20 and the fittings 71, 72, 73, 74 as well as the temperature probes 11, 12, 13, 14 therein are subject to a (mechanical) deforming process, e.g. a drawing process.

Figure 4:
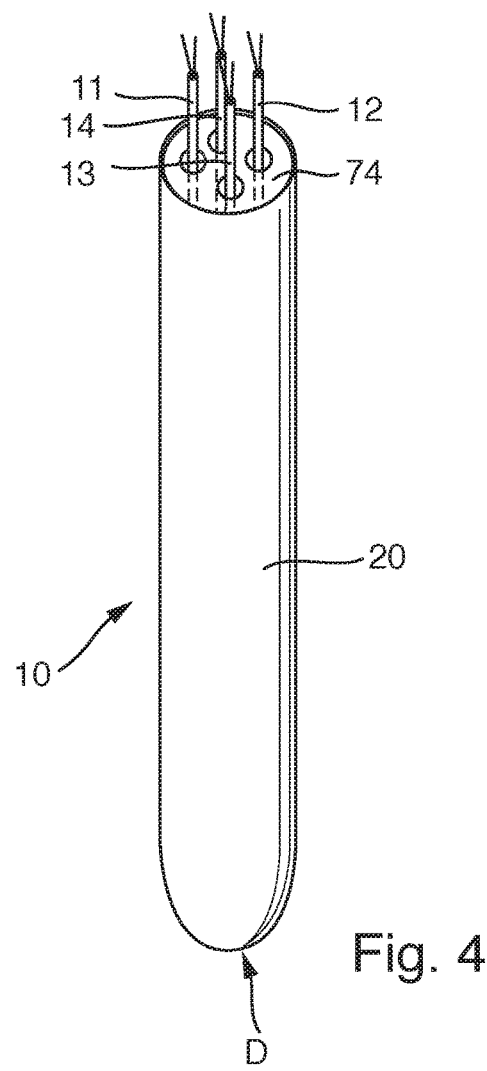
FIG. 4 shows a diagram of an assembly, in which the fitting blocks are inserted after it is deformed.

The result of such a drawing process is shown in FIG. 4. After the drawing the whole assembly the length of the assembly is extended and the diameter is reduced compared to the geometry of the assembly before the drawing process. However the drawing (process) may only stretch the assembly as shown in FIG. 3 to an extent which won't rupture the wires or other components in the temperature probes 11, 12, 13, 14. And yet a region with an enlarged diameter may remain at e.g. the proximal end of the assembly.

Hence, a temperature sensing assembly is fabricated. The distal end D of the assembly may also be closed by cap or end plate, which may be welded to the sleeve member in order to cover the base area of the assembly. The assembly allows temperature monitoring at different locations (linear profile, two or three dimensional profile) using a unique probe. Instead of the thermocouples shown, different types temperature sensors may be employed, e.g. temperature dependent resistors may be employed. The described assembly can be used, for instance, to detect temperature distribution inside a vessel, to monitor chemical reactions, to increase processes efficiency and thus improve quality of final product.

Figure 5:
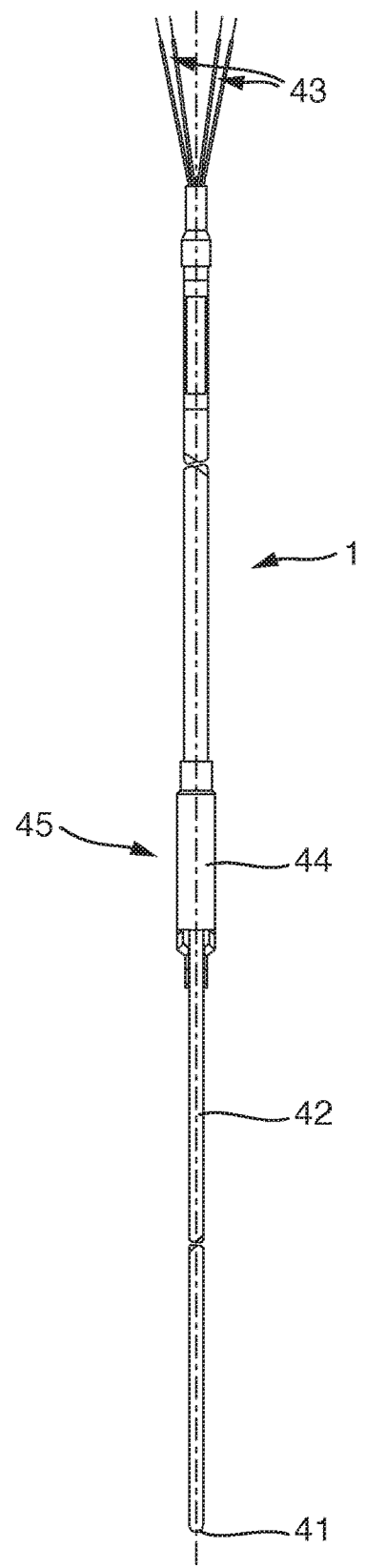
FIG. 5 shows a diagram of another temperature probe.

FIG. 5 shows another example of a temperature probe 1. This probe possesses a mineral isolated cable 42 in which a sensor element is arranged, preferably at its tip 41. A sensor signal may be transmitted via sensor wires which extend through the cable 42. The sensor wires are connected to extension wires 43. The connection between the sensor wires and the extension wires is made in a tube section 45. In this tube section 45 a tube 44 is connected to the cable 42, e.g. the tube 44 is welded or crimped to the cable 42. Inside the tube the connection between the sensor wires and the extension wires 43 is established.

Figure 6:
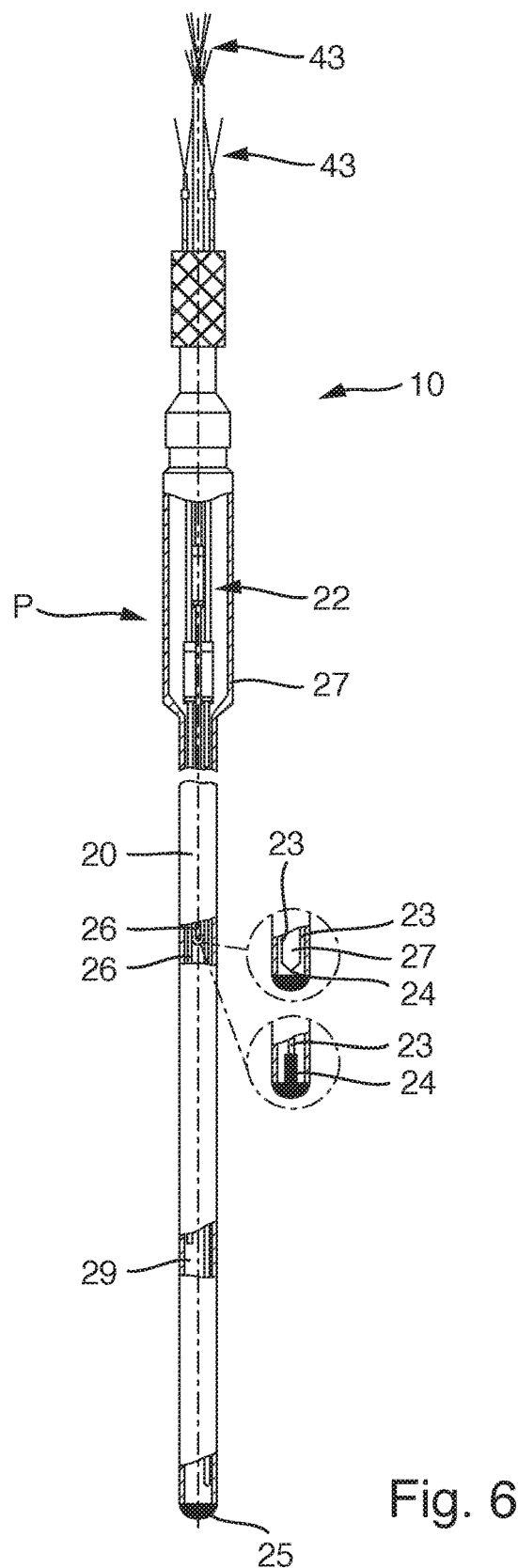
FIG. 6 shows a diagram of a ready-made temperature sensing assembly, having a sleeve member and a tube connected to the outer sleeve.

With reference to FIG. 6, the assembly comprises a sleeve member 20 which has a sealed end 25 and multiple temperature probes 26 arranged inside sleeve member 20. In order to guarantee proper mechanical behavior, flexibility and adequate thermal properties at least one fitting in which the temperature probes have been arranged is shattered and pressed surrounding each sensor and within the sleeve member 20. However, instead of the at least one pre-formed fitting a pulverulent material could be employed to guarantee above mentioned properties. The pulverulent material may be inserted into sleeve member 20, e.g. completely fill its cavity, before deforming in. hence. By way of deforming the sleeve member 20 the pulverulent material may be compressed and the probes 26 or elongated members arranged inside the sleeve member 20.

The aim of sleeve member 20 is to contain a single or a plurality of temperature probes 26 in a small volume, having as a result an appropriate compaction rate of internal insulation powder, internal space optimization, flexibility and overall strength.

The purpose of the sealed end 25 and the sleeve member 20 is to protect internal sensors against abrasion, corrosive fluids and mechanical shocks; this can be achieved by way of welding technics, melting deposits, rods or others techniques. An opposed end 22 may be foreseen to connect the sensor wires (flexible free wires or rigid electrodes) 23 of each sensor 24 to a plurality of connection cables pairs 43 (as shown in FIG. 5) to any possible remote connection system. Each sensor 24, which may be a thermocouple or a resistance temperature device, has a pair of conductors 23 or a plurality of pairs. In the case of a thermocouple these wires 23 are made by different materials per each pair. Each pair is joined at a junction point, the so called hot junction. In case of sensors made by thermoresistances, each sensor can be obtained by means of electrodes (with the same chemical composition), joined at a junction point. In case of thermocouple technology, a junction point is obtained by means of capacity discharge, ultrasonic method, crimping (among conductors or thanks to additional inserts), alloys melting or different technics, in order to have the needed electrical continuity. In case of thermoresistance technology, a measuring point 24 is obtained by means of resistance interposition at correct location. The free ends of extension wires 43 can be connected to instrumentation devices, such as a measuring electronics, for signal treatment.

Sleeve member 20 has at two or more sensors placed in an optimized pattern by means of filling material 29. Various and different type of filling materials 29 may be used if necessary, increasing thermal properties close to the measuring points and avoiding thermal conductivity between different points along length of the sleeve member 20. Crushable inserts, spacers or solid insulators can be used as a fitting, e.g. in the form of a block as e.g. shown in FIG. 2. In a manufacturing process, at least one fitting and/or filling material may be prepared in advance and inserted with a plurality of probes or other types of elongated members in sleeve member 20, then swaged or drawn.

After swaging or drawing process, an appropriate insulation, or conductive, material (in powder or solid form) may be filled in the sleeve element 20 before doing the end closure 25 to seal the assembly. The result is a double barrier between the process environment and the electric circuits of temperature probes 26, with high mechanical strength and reliability. The assembly is able to measure temperature values allowing one fault (on sleeve member 20) without affecting inner sensors 24.

At the proximal end P of the assembly a tube 21 (directly connected on the sleeve member 20 or mounted on it) allows connecting individual electrical wires 23 of each sensor 24 to a extension wires, which may have the form of cables. The internal volume of the tube 21 is filled with proper insulating resin. When it is necessary, extension wires 43 can be coupled to a fast connector (not shown).

It should be noticed that three probes 26 are illustrated for purposes of explanation only and that various numbers of probes can be utilized depending on space constraints and the desired application. Additionally, various combinations of different sensors and measuring principles can be used. A variety of materials also may be used to form sleeve member 20.

Identifying each measuring point by proper labeling, e.g. of extension wires 43, a temperature profile is obtained due to the plurality of temperature probes inside each sleeve member 20 and due to the possibility of having several probes, with different possible locations inside a volume (vessel, tank or other).

The invention claimed is:

1. A method for fabricating a multi-point sensing assembly with multiple measuring points for sensing temperature, comprising:
    inserting at least one elongated member; and at least one pre-formed fitting into an inner cavity of a sleeve member, wherein said at least one elongated member is a temperature probe for determining temperature and has a rod like form in which at least one sensor element is arranged, and said at least one elongated member has a metallic outer sheath, which is filled with an insulating material in which said at least one sensor element is embedded; and
    shattering said pre-formed fitting positioned within said inner cavity.

2. The method according to claim 1, wherein:
    said at least one pre-formed fitting has at least one recess, which serves for receiving said elongated member; and
    said at least one elongated member is inserted into said a least one recess.

3. The method according to claim 1, further comprising:
    inserting said at least one pre-formed fitting at least partially into said inner cavity of said sleeve member.

4. The method according to claim 1, wherein:
    said at least one pre-formed fitting is shattered during a drawing process of the sleeve member and/or drawing of the at least one elongated member.

5. The method according to claim 1, wherein:
    said pre-formed fitting is made out of an insulating material, and
    said pre-formed fitting is dimensioned or arranged in such a manner in said sleeve member that it fills said cavity of said sleeve member.

6. The method according to claim 1, wherein:
    said at least one elongated member is embedded in an insulating material of said sleeve member.

7. The method according to claim 1, wherein:
    said at least one sensor element is a thermocouple or a resistance thermometer.

8. The method according to claim 1, wherein:
    said shattering occurs by deforming said sleeve member; and
    deforming of said sleeve member comprises pressing and/or drawing said sleeve member.

9. The method according to claim 8, wherein:
    said at least one elongated member is mechanically connected, with the shattered and squeezed material that the pre-formed fitting is made out of during deforming of said sleeve member.

10. The method according to claim 1, wherein:
    said at least one pre-formed fitting has at least one opening, which serves for receiving said at least one elongated member, and
    said at least one elongated member is inserted into said at least one opening.

11. The method according to claim 10, wherein:
    a first elongated member extends to a first height along the length of said sleeve member in a first of the openings and a second elongated member extends to a second height along the length of said sleeve member in a second of the openings.

12. The method according to claim 10, wherein:
    in each of the openings of the at least one pre-formed fitting either a temperature probe or a dummy element, in which no sensor element is arranged or which does not serve for determining a temperature, is inserted.

13. The method according to claim 12, wherein:
    said dummy element has a metallic outer sheath, which is filled with an insulating material.

14. A temperature sensing assembly fabricated according to a method, comprising the steps of:
    inserting at least one elongated member and at least one pre-formed fitting into an inner cavity of a sleeve member, wherein said at least one elongated member is a temperature probe for determining temperature and has a rod like form in which at least one sensor element is arranged, and said at least one elongated member has a metallic outer sheath, which is filled with an insulating material in which said sensor element is embedded, and
    shattering said pre-formed fitting positioned within said inner cavity.

* * * * *